United States Patent
Czuba et al.

(10) Patent No.: US 10,223,637 B1
(45) Date of Patent: Mar. 5, 2019

(54) PREDICTING ACCURACY OF SUBMITTED DATA

(71) Applicant: Google LLC, Mountain View, CA (US)

(72) Inventors: Krzysztof Czuba, New York, NY (US); Evgeniy Gabrilovich, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 252 days.

(21) Appl. No.: 13/906,220

(22) Filed: May 30, 2013

(51) Int. Cl.
*G06N 99/00* (2019.01)
*G06N 5/02* (2006.01)

(52) U.S. Cl.
CPC ............. *G06N 5/022* (2013.01); *G06N 5/02* (2013.01); *G06N 99/005* (2013.01)

(58) Field of Classification Search
CPC ............................... G06N 5/04; G06N 99/005
See application file for complete search history.

(56) References Cited

U.S. PATENT DOCUMENTS

| | | | |
|---|---|---|---|
| 4,961,139 A | 10/1990 | Hong et al. | |
| 5,418,942 A | 5/1995 | Krawchuk et al. | |
| 5,564,119 A | 10/1996 | Krawchuk et al. | |
| 5,872,973 A | 2/1999 | Mitchell et al. | |
| 5,913,214 A | 6/1999 | Madnick et al. | |
| 6,098,078 A | 8/2000 | Gehani et al. | |
| 6,175,835 B1 | 1/2001 | Shadmon | |
| 6,208,993 B1 | 3/2001 | Shadmon | |
| 6,282,537 B1 | 8/2001 | Madnick et al. | |
| 6,327,590 B1 * | 12/2001 | Chidlovskii et al. | ......... 707/734 |
| 6,356,916 B1 | 3/2002 | Yamatari et al. | |
| 6,408,282 B1 | 6/2002 | Buist | |
| 6,477,580 B1 | 11/2002 | Bowman-Amuah | |
| 6,529,948 B1 | 3/2003 | Bowman-Amuah | |
| 6,578,041 B1 | 6/2003 | Lopet | |
| 6,626,954 B1 | 9/2003 | Kamachi et al. | |
| 6,640,242 B1 | 10/2003 | O'Neal et al. | |
| 6,799,184 B2 | 9/2004 | Bhatt et al. | |
| 6,915,451 B2 | 7/2005 | Fitzgerald et al. | |
| 7,225,249 B1 | 5/2007 | Barry et al. | |
| 7,240,330 B2 | 7/2007 | Fairweather | |
| 7,305,404 B2 | 12/2007 | Owens et al. | |

(Continued)

FOREIGN PATENT DOCUMENTS

| | | |
|---|---|---|
| EP | 0350208 | 1/1990 |
| EP | 1126681 | 8/2001 |

(Continued)

OTHER PUBLICATIONS

Abadi, D., et al., "SW-Store: a vertically partitioned DBMS for Semantic Web data management", The VLDB Journal, 2008, vol. 18, pp. 385-406.

(Continued)

*Primary Examiner* — Ben M Rifkin
(74) *Attorney, Agent, or Firm* — Fish & Richardson P.C.

(57) ABSTRACT

Methods, systems, and apparatus, including computer programs encoded on computer storage media, for predicting the accuracy of user submissions. One of the methods includes receiving, from a user, an update to an attribute of an entity related to a topic. If the user is determined to be reliable relative to the topic based on user profile data of the user, the knowledge base is updated with the update to the attribute of the entity.

23 Claims, 5 Drawing Sheets

(56) References Cited

U.S. PATENT DOCUMENTS

| | | | |
|---|---|---|---|
| 7,630,986 | B1 | 12/2009 | Herz et al. |
| 7,729,904 | B2 | 6/2010 | Bennett |
| 8,032,503 | B2 | 10/2011 | Bouloy et al. |
| 8,204,856 | B2 | 6/2012 | Meyer et al. |
| 2002/0049810 | A1 | 4/2002 | Fitzgerald et al. |
| 2002/0091702 | A1 | 7/2002 | Mullins |
| 2003/0093322 | A1* | 5/2003 | Sciuk ............... G06Q 10/1053 |
| | | | 705/7.32 |
| 2003/0126136 | A1 | 7/2003 | Omoigui |
| 2003/0163597 | A1 | 8/2003 | Hellman et al. |
| 2003/0179228 | A1 | 9/2003 | Schreiber et al. |
| 2003/0236795 | A1 | 12/2003 | Kemp et al. |
| 2004/0225865 | A1 | 11/2004 | Cox et al. |
| 2004/0230572 | A1 | 11/2004 | Omoigui |
| 2004/0236598 | A1 | 11/2004 | Thomsen |
| 2005/0027725 | A1 | 2/2005 | Kagalwala et al. |
| 2005/0050030 | A1 | 3/2005 | Gudbjartsson et al. |
| 2005/0086256 | A1 | 4/2005 | Owens et al. |
| 2005/0120311 | A1* | 6/2005 | Thrall ............... G06F 17/30867 |
| | | | 715/811 |
| 2005/0210000 | A1 | 9/2005 | Michard |
| 2005/0216421 | A1 | 9/2005 | Barry et al. |
| 2005/0251805 | A1 | 11/2005 | Bamba et al. |
| 2005/0289134 | A1 | 12/2005 | Noguchi |
| 2006/0004703 | A1 | 1/2006 | Spivack et al. |
| 2006/0047615 | A1* | 3/2006 | Ravin et al. ..................... 706/50 |
| 2006/0075120 | A1 | 4/2006 | Smit |
| 2006/0100989 | A1 | 5/2006 | Chinchwadkar et al. |
| 2006/0100995 | A1 | 5/2006 | Albornoz et al. |
| 2006/0173873 | A1 | 8/2006 | Prompt et al. |
| 2006/0184538 | A1* | 8/2006 | Randall ............. G06F 17/30041 |
| 2006/0212432 | A1 | 9/2006 | Tsai |
| 2006/0218123 | A1 | 9/2006 | Chowdhuri |
| 2007/0061487 | A1 | 3/2007 | Moore et al. |
| 2007/0078675 | A1* | 4/2007 | Kaplan ............................ 705/1 |
| 2007/0087756 | A1 | 4/2007 | Hoffberg |
| 2007/0168340 | A1 | 7/2007 | Mahoney et al. |
| 2007/0233627 | A1 | 10/2007 | Dolby et al. |
| 2007/0239694 | A1 | 10/2007 | Singh et al. |
| 2007/0255674 | A1 | 11/2007 | Mahoney |
| 2007/0266384 | A1 | 11/2007 | Labrou |
| 2007/0299836 | A1 | 12/2007 | Hou et al. |
| 2008/0027980 | A1 | 1/2008 | Owens et al. |
| 2008/0033993 | A1 | 2/2008 | Uceda-Sosa |
| 2008/0046474 | A1 | 2/2008 | Sismanis |
| 2008/0059455 | A1* | 3/2008 | Canoy et al. ..................... 707/5 |
| 2008/0109493 | A1 | 5/2008 | Zaifman et al. |
| 2009/0024590 | A1 | 1/2009 | Sturge et al. |
| 2009/0055384 | A1* | 2/2009 | Jain et al. ........................ 707/5 |
| 2009/0125382 | A1* | 5/2009 | Delepet ........................... 705/10 |
| 2010/0070448 | A1 | 3/2010 | Omoigui |
| 2010/0121817 | A1 | 5/2010 | Meyer et al. |
| 2010/0121839 | A1 | 5/2010 | Meyer et al. |
| 2010/0174692 | A1 | 7/2010 | Meyer et al. |
| 2011/0093500 | A1 | 4/2011 | Meyer et al. |
| 2013/0166340 | A1* | 6/2013 | Salame ........................ 705/7.14 |

FOREIGN PATENT DOCUMENTS

| | | |
|---|---|---|
| EP | 1229442 | 8/2002 |
| EP | 1260916 | 11/2002 |
| EP | 1274018 | 1/2003 |
| EP | 1640838 | 3/2006 |
| EP | 1645974 | 4/2006 |
| EP | 1653308 | 5/2006 |
| EP | 1653376 | 5/2006 |
| WO | 1997/45800 | 12/1997 |
| WO | 1998/49629 | 11/1998 |
| WO | 1999/38094 | 7/1999 |
| WO | 2001/08045 | 2/2001 |
| WO | 2001/86421 | 11/2001 |
| WO | 2001/086422 | 11/2001 |
| WO | 2001/086424 | 11/2001 |
| WO | 2001/086427 | 11/2001 |
| WO | 2001/086439 | 11/2001 |
| WO | 2003/001413 | 1/2003 |
| WO | 2004/075466 | 9/2004 |
| WO | 2004/114153 | 12/2004 |
| WO | 2005/0170775 | 2/2005 |
| WO | 2005/050481 | 6/2005 |
| WO | 2005/065166 | 7/2005 |
| WO | 2005/079405 | 9/2005 |
| WO | 2005/081963 | 9/2005 |
| WO | 2005/098620 | 10/2005 |
| WO | 2006/036127 | 4/2006 |
| WO | 2006/076199 | 7/2006 |
| WO | 2006/116649 | 11/2006 |
| WO | 2007/100834 | 9/2007 |
| WO | 2010/085523 | 7/2010 |

OTHER PUBLICATIONS

Auer et al., "What have Inssbruck and Leipzig in common—Extrating Semantic from Wiki Content", Jan. 23, 2007, 15 pgs.

Australian Office Action dated Oct. 6, 2011 from Australian Patent Office for AU Application No. 2009223127, 2 pages.

Buneman, et al.; "A query language and optimization techniques for unstructured data"; Jun. 1996; ACM SIGMOD Records, pp. 505-516, vol. 25, Issue 2.

Buneman, et al.; "Adding structure to unstructured data"; Jan. 1997; Database Theory—ICDT '97, pp. 336-350, Springer Berlin/Heidelberg.

Buneman, et al.; "Path constraints in semistructured databases"; Oct. 2000; Journal of Computer and System Sciences, vol. 61, Issue 2, pp. 146-193.

Buneman, et al.; "Semistructured data"; May 1997; Proc. of the Sixteenth ACM SIGACT-SIGMOD-SIGART Symposium on Principles of Database; 117-121; Tucson, Arizona.

Buneman, et al.; "Query optimization for semistructured data using path constraints in a deterministic data model"; Jan. 2000; Research Issues in Structured and Semistructured Database Programming, pp. 208-223, vol. 1949/2000.

Chang, et al.; "Bigtable: a distributed storage system for structured data"; Nov. 2006; Presented at the Proc. of the 7th USENIX Symposium on Operating Systems, OSDI, pp. 205-218.

Crysmann, et al.; "An integrated architecture for shallow and deep processing"; Jul. 2002; Proc. of the 40th Annual Meeting of the Association for Computational Linguistics (ACL), pp. 441-448, Philadelphia.

*Cyc Enhancement of Information Extraction*; copyright 2004 Cycorp, Inc., retrieved on Apr. 6, 2008 from: http://cyc.com/technology/whitepapers_dir/IE-Improvement-Whitepaper.pdf, 4 pages.

Degener, J., et al., "Optimizing Schema-Last Tuple-Store Queries in Graphd", *SIGMOD '10*, Jun. 6-11, 2010, Indianapolis, Indiana, 2010, pp. 1047-1055.

Giugno, et al.; "GraphGrep: a fast and universal method for querying graphs"; Aug. 2002; 16th Int'l Conf. on Pattern Recognitions (ICPR '02), p. 20112, vol. 2.

Gyssens, et al; "A graph-oriented object database model"; Apr. 1990, Proc. of the 9th ACM SIGACT-SIGMOD-SIGART symposium on Principles of Database systems; pp. 417-424, Nashville, Tennessee.

International Preliminary Report of Patentability for PCT Application No. PCT/US2009/036991, dated Sep. 14, 2010, 7 pages.

International Search Report for PCT Application No. PCT/US2009/036991, dated Dec. 23, 2009, 2 pages.

Written Opinion of the International Searching Authority for PCT Application No. PCT/US2009/036991, dated Dec. 23, 2009, 6 pages.

International Search Report and Written Opinion for PCT Application No. PCT/US10/21579, dated May 26, 2010, 14 pages.

International Preliminary Report of Patentability for PCT Application No. PCT/US10/21579, dated Jul. 26, 2011, 12 pages.

Janik et al., Wikipedia in action—Ontological Knowledge in Text Categorization, Aug. 2007.

Joslyn, C.; "Semantic webs: a cyberspatial representation form for cybernetics"; Apr. 1996; Cybernetics and Systems '96, pp. 905-910.

(56) References Cited

OTHER PUBLICATIONS

Krotzsch et al., "Semantic Wikipedia," Web Semantics: Science and Agents on the World Wide Web, 5:251-261, 2007.
Kumar, et al.; "A database for storage and fast retrieval of structure data: a demonstration"; Mar. 2003; 19th Int'l Conf. on Data Engineering, p. 789, Bangalore, India.
Lamparter, et al.; *Knowledge extraction from classification schemas*; Oct. 25-29, 2004; International Conferences on Ontologies, Databases and Applications of Semantics (ODBASE) 2004, Proceedings Part I (lecture notes in Computer Science vo. 3290) pp. 618-636; retrieved online at: http://www.aifb.uni-karlsruhe.de/WBS/sla/paper/ODBASE04_Lamparter.pdf.
Linksvayer, "Querying Wikipedia like a Database", Jan. 23, 2007, 4 pages.
Molnar, et al.; "On verticum-type linear systems with time-dependent linkage"; Jan. 1994; Applied Mathematics and Computation; pp. 89-102, vol. 60, No. 1; Elsevier Science, Inc., New York; retrieved on Apr. 6, 2008 from website: http://www.mathnet.or.kr/mathnet/thesis_content.php?no_314899.
Ozsoyoglu, et al.; "A new normal form for nested relations"; Mar. 1987; ACM Transactions on Database Systems, pp. 111-136, vol. 12, issue 1; New York.
Pradeep, et al., "Towards autonomic websites based on learning automata"; May 2005; Int'l World Wide Web Conf., pp. 1044-1045, Chiba, Japan.
Prud'hommeaux—Persistent RDF Databases, 1999, 5 pages.
Rice et al., Defining and Implementing Domains with Multiple Types using Mesodata Modelling Techniques, 2006, 9 pages.
Srinivasa, et al.; "LWI and Safari: a new index structure and query model for graph databases"; Jan. 2005, In Proc. 11th Int'l Conf. on Management of Data (COMAD 2005), pp. 138-147, India.
Srinivasa, et al.; "Vectorization of structure to index graph databases"; Sep. 2002; Proc. of the IASTED Int'l conf. on Information Systems and Databases; Tokyo, Japan.
Suciu, D.; "Distributed query evaluation on semistructured data"; 1997; AT&T Laboratories.
Volkel et al., "Semantic Wikipedia," ACM May 23-26, 2006, 10 pages.
Wang, C., et al., "Scalable mining of Large Disk-based Graph Databases", *KDD '04*, Aug. 22-25, 2004, Seattle, Washington, 2004, 10 pages.
Weiss, C., et al., "Hexastore: Sextuple Indexing for Semantic Web Data Management", *VLDB '08*, Aug. 24-30, 2008. Aukland, New Zealand, 2008, pp. 1-12.
Wikimedia Foundation, Semantic MediaWiki—Meta, Feb. 27, 2006, 4 pages.
Wikipedia, Wikipedia:Administrators, Mar. 12, 2006, 7 pages.
Wikipedia, Wikipedia:Categorization, Mar. 12, 2007, 22 pages.
Wikipedia, Wikipedia:Categorization of people, Mar. 2, 2007, 14 pages.
Yan, X.; "Graph Indexing: a frequent structure-based approach"; Jun. 13-18, 2004; Proc. of the ACM SIGMOD Int'l conf. on Management of Data; pp. 335-346, Paris, France.
Zhuge, H. "Resource space grid: model, method and platform"; Sep. 2004; Concurrency and Computation Practice & Experience; pp. 1385-1413, vol. 16, issue 14, UK.
AxelBoldt; Wikipedia (Everything2); Jan. 27, 2002; http://meta.wikimedia.org/wiki/Wikipedia_%28Everything2%29, 2 pages.
Buneman, et al. "Interaction between path and type constraints"; 1998; Dept. of Computer & Information Science, Technical Report No. MS-CIS-98-16; Univ. of Pennsylvania, pp. 1-14.
Buneman, et al.; "A deterministic model for semi-structured data"; 1998, Univ. of Pennsylvania, 6 pages.
Broekstra, blog comment, Feb. 24, 2005 (p. 3 of Ayers, SPARQL Query Language for RDF), pp. 1-7.
Chiueh, et al.; "Efficient real-time index updates in text retrieval systems"; Apr. 1999; Computer Science Dept. State Univ. of New York at Stony Brook, 11 pages.
Clark et al., Serializing SPARQL Query Results in JSON, Feb. 16, 2006, pp. 1-8.
Corby, et al.; "A conceptual graph model for W3C resource description framework"; Aug. 2000; Intl Conf. on Conceptual Structures; Darmstadt, Germany, 14 pages.
Cycorp; Semantic Knowledge Source Integration; SKSI; retrieved online Apr. 6, 2008, copyright 2002-2010, Cycorp. Inc.; retrieved online from: http://www.cyc.com/cyc/cycrandd/areasofrandd_dir/sksi, 1 page.
Ellmer, E.; "Object-oriented query languages: analysis and evaluation"; retrieved on Apr. 6, 2008 from website: citeseer.ist.psu.edu/69436.html, pp. 1-10.
Fan et al.: "Specifying and reasoning about workflows with path constraints"; Dec. 199; ICSC '99; China; Lecture Notes in Computer Science; internet Applications, vol. 1749. Springer Berlin/Heidelberg, 10 pages.
Fernandez, et al.; "Optimizing regular path expressions using graph schemas"; Feb. 1998; Proc. Int'l conf. on Data Engineering, Orlando, Florida, pp. 1-21.
"Freebase", Wikipedia [online]. [Retrieved on Dec. 9, 2011]. Retrieved from the Internet: <URL: http://en/wikipedia.org/wiki/Freebase>, 1 page.
Jeays, Mark; Wikipedia: An Online Collaborative Encyclopedia; 2002; http://meta.wikimedia.org/wiki/Wikipedia_-_by_Mark_Jeays%2C_2002, 2 pages.
Kuramochi, et al.; "An efficient algorithm for discovering frequent subgraphs"; Jun. 2002; Dept. of Computer Science/Army HPX Research Center, Univ. of Minnesota, Technical report 02-0260, pp. 1-27.
Berners-Lee, et al.; The Semantic Web; May 17, 2001; Scientific American.com; retrieved online at http://www.sciam/com/print_version.cfm?articleID=00048144-10D2-1C70-84A9809EC588EF21, 36 pages.
Meyer, S., "A Brief Tour of Graphd", The Freebase Blog [online]. Apr. 9, 2008 [retrieved on Dec. 9, 2011]. Retrieved from the Internet: <URL: http://blog.freebase.com/2008/04/09/a-brief-tour-of-graphd/>, pp. 1-7.
O'Neil, P.; "The SB-tree: an index-sequential structure for high-performance sequential access"; Jun. 1992; Acta Informatica, vol. 29; Dept. of Mathematics and Computer Science, Univ. of Massachusetts, Boston, pp. 1-24.
Schafer, U.; "WHAT: an XSLT-based infrastructure for the integration of natural language processing components"; Apr. 2003; Language Technology Lab, German Research Center for Artificial Intelligence (DFKI), Saarbrucken, Germany, 8 pages.
Seeger, B; "Tuning access methods to supporting data-intensive queries"; Nov. 1994, Ludwig-Maximilians-Universitat Munchen Institut fur Informatik, retrieved from: citeseer.ist.psu.edu/seeger94tuning.html, 30 pages.
"Service-Oriented Architecture Technology Center"; Jan. 25, 2008; retrieved on Apr. 6, 2008 from website: http:www.oracle.com/technology/tech.soa/index.html, 2 pages.
Siegel, et al.; *The Cyc System: Notes on Architecture*; Nov. 2004; Cycorp Inc., Austin, TX; retrieved online at http://www.cyc.com/technoloy/whitepapers_dir/Cyc_Archicture_and_API.pdf, pp. 1-9.
Srinivasa, et al.; "A flexible retrieval mechanism for structural data using multiple vectors spaces"; May 7, 2002; Indian Institute of Information Technology, International Technology Park, Bangalore, India, retrieved from: citeseer.ist.psu.edu/srinivasa02flexible.html, pp. 1-14.
TopicMaps.Org Authoring Group; *XML Topic Maps (XTM)* 1.0; Aug. 1, 2006; retrieved on Jun. 9, 2006 http://topicmaps.org/xtm/#desc-introm, 97 pages.
Vincent, M.; "Semantic foundations of 4NF in relational database design"; Mar. 1999; Acta Informatica; Adelaide, Australia, citeseer.ist.psu.edu/766104.pdf., pp. 1-43.
"W3C Semantic Web Activity"; copyright 1994-2010, W3C, retrieved online Apr. 6, 2008, from website: http://www.w3.org/2001/sw/, 4 pages.
Wikipedia; *Object Database*; retrieved online Apr. 6, 2008 from website: "http://en.wikipedia.org/wiki/Object_database", 5 pages.
Wikipedia; *Resource Description Framework*; retrieved online Apr. 6, 2008 from website: http://en.wikipedia.org/wiki/Resource_Description_Framework, 9 pages.

(56) References Cited

OTHER PUBLICATIONS

Wikipedia; *Topic Maps*; retrived online Apr. 6, 2008 from website: "http://en.wikipedia.org/wiki/Topic_map", 4 pages.
Wong, L.; "Querying nested collections"; 1994; Presented to the Faculties of the Univ. of Pennsylvania in Partial Fulfillment of the Requirements for the Degree of Doctor of Philosophy, 308 pages.

\* cited by examiner

PREDICTING ACCURACY OF SUBMITTED DATA

BACKGROUND

This specification relates to determining whether a submission of data by a user is accurate.

A search system can provide one or more knowledge panels in response to a received search query. A knowledge panel is a user interface element that provides a collection of information or other content related to a particular entity referenced by the search query. For example, the entity may be a person, place, country, landmark, animal, historical event, organization, business, sports team, sporting event, movie, song, album, game, work of art, or any other entity.

In general, a knowledge panel provides a summary of information about the entity. For example, a knowledge panel for a famous singer may include the name of the singer, an image of the singer, a description of the singer, one or more facts about the singer, content that identifies songs and albums recorded by the singer, and/or links to searches related to the singer. Other types of information and content can also be presented in the knowledge panel. Information presented in a knowledge panel can include content obtained from multiple disparate sources, e.g., multiple different web pages accessible over the Internet.

A search system can maintain a knowledge base that stores information about various entities. The system can assign a unique entity identifier to each entity. The system can also assign one or more text string aliases to a particular entity. For example, the Statue of Liberty can be associated with aliases "the Statue of Liberty" and "Lady Liberty." Aliases need not be unique among entities. For example, "jaguar" can be an alias both for an animal and for a car manufacturer.

The system can also store information about an entity's relationship to other entities. For example, the system can define a "located in:" relationship between two entities to reflect, for example, that the Statue of Liberty is located in New York City. In some implementations, the system stores relationships between entities in a representation of a graph in which nodes represent distinct entities and links between nodes represent relationships between the entities. In this example, the system could maintain a node representing the Statue of Liberty, a node representing New York City, and a link between the nodes to represent that the Statue of Liberty is located in New York City.

SUMMARY

This specification describes how a system can compute a likelihood that a user will provide accurate updates to a knowledge base based on information in the user's profile. In general, the system can train a model using previous knowledge base submissions by users and use the model to predict whether a particular user will provide accurate updates.

In general, one innovative aspect of the subject matter described in this specification can be embodied in methods that include the actions of receiving, from a user, an update to an attribute of an entity related to a topic; obtaining user profile data of the user; determining from the user profile data that the user is reliable relative to the topic; and in response to determining that the user is reliable relative to the topic, updating a knowledge base with the update to the attribute of the entity. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining that the user is reliable relative to the topic comprises computing, using the user profile data as input to a user model, a likelihood that an update from the user to an entity related to the topic is accurate; and determining that the computed likelihood satisfies a threshold. The user model is trained using training examples that represent previously submitted updates to the knowledge base by users and whether the previously submitted updates were accurate. Each training example includes information from a user profile of a user that submitted the corresponding update. The information from the user profile includes one or more statistics describing the accuracy of knowledge base submissions by the user or a topic of interest and a level of expertise for the topic of interest. The information from the user profile includes information about subsystems accessed by the user. The update to the attribute of the entity includes an update to a value of an existing attribute of the entity stored in the knowledge base. The update to the attribute of the entity includes a new attribute of the entity that was previously not stored in the knowledge base. The threshold is different for an existing attribute of the entity than for a new attribute for the entity. The updated entity attribute in the knowledge base is provided in response to search requests by users.

In general, another innovative aspect of the subject matter described in this specification can be embodied in methods that include the actions of receiving, from a user, a search request related to a topic; obtaining user profile data of the user; determining from the user profile data that the user is reliable relative to the topic; in response to determining that the user is reliable relative to the topic, providing to the user a request for an update to an attribute of an entity related to the topic; receiving, from the user, an update to the attribute of the entity related to the topic; and updating a knowledge base with the update to the attribute of the entity. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Determining that the user is reliable relative to the topic comprises computing, using the user profile data as input to a user model, a likelihood that an update from the user to an entity related to the topic is accurate; and determining that the computed likelihood satisfies a threshold. The user model is trained using training examples that represent previously submitted updates to the knowledge base by users and whether the previously submitted updates were accurate. Each training example includes information from a user profile of a user that submitted the corresponding update. The information from the user profile includes one or more statistics describing the accuracy of knowledge base submissions by the user or a topic of interest and a level of expertise for the topic of interest. The information from the user profile includes information about subsystems accessed by the user. Providing to the user a request for an update to an attribute of an entity related to the topic comprises providing a knowledge panel that presents one or more items of information about the entity and requests the update to the attribute of the entity. Receiving, from a user, an update to an attribute of an entity related to a topic comprises receiving the update to the attribute of the entity through a user interface control of the knowledge panel.

The subject matter described in this specification can be implemented in particular embodiments so as to realize one or more of the following advantages. A search system can automatically determine whether a submission from a user is likely to be accurate based on the accuracy of previous submissions received from the user or other indications of user trustworthiness. This can reduce the amount of erroneous or spam inputs to the knowledge base. A search system is more likely to receive accurate data updates for a particular topic by asking users who are interested in the particular topic to provide updates on the topic. This can reduce the likelihood that a user will be annoyed by being asked to provide an update and can increase the likelihood of receiving a response from a user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Some search systems allow users to update data stored in a knowledge base. In general, an update to the knowledge base updates an [attribute, value] pair associated with an entity. For example, a user can submit an update to the knowledge base for an existing attribute "date of birth," where the updated value is "Feb. 12, 1809." A user may also submit an update to the knowledge base for a new attribute associated with a person entity, e.g., "Favorite food," and a corresponding new value, e.g., "pizza," providing both the new attribute and the new value.

However, in some cases it may be difficult for the search system to determine whether data entered by a user is correct, as the user may intentionally or unintentionally enter incorrect data.

A search system can create a user model to determine whether a particular user is likely to provide accurate updates to the knowledge base. The search system can use machine learning to generate the user model based on the accuracy of updates to the knowledge base previously entered by the user and profile information associated with the user. Once the user model is developed, the search system can use the user model to predict the accuracy of knowledge base updates submitted by the user, determine whether to update the knowledge base with the submitted data, and determine whether or not to ask a the user for specific data or verification of data in the knowledge base.

Figure 1:
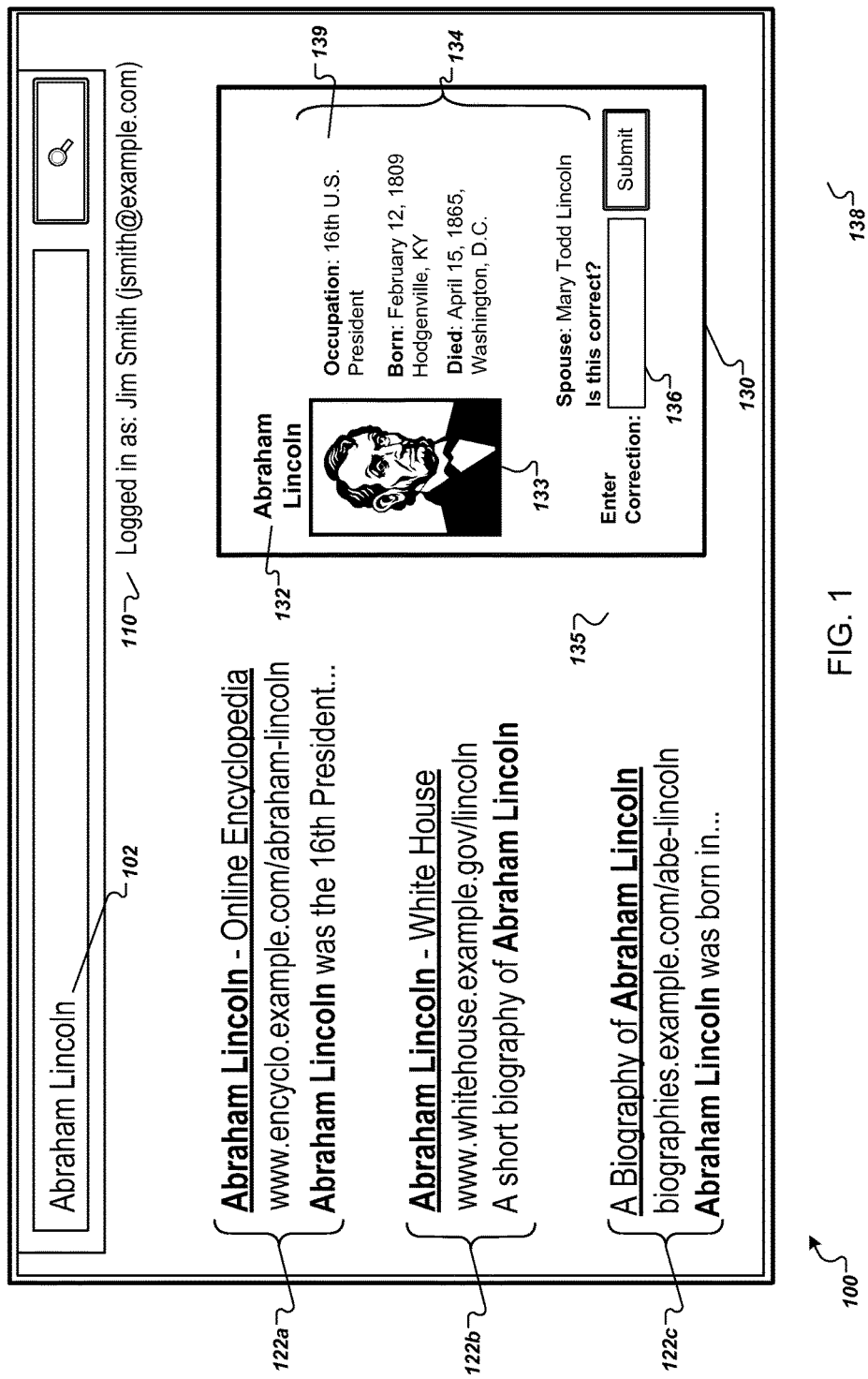
FIG. 1 illustrates an example search results page that includes a knowledge panel.

FIG. 1 illustrates an example search results page 100 that includes a knowledge panel 130. A user can submit the query 102 to a search system through a graphical user interface of a software application, e.g., a web browser, or through a user interface of some other software application installed on a user device, e.g., a spoken query issued through a speech recognition application installed on a mobile user device. In response to receiving the query 102, the search system can provide a search results page 100 in a form that can be presented on the user device. For example, the search results page 100 can be provided as a markup language document, e.g., a HyperText Markup Language document, and the user device can render the document, e.g., using a web browser, in order to present the search results page 100 on a display of the user device.

The search results page 100 includes three search results 122a-c that the search system has obtained in response to the query 102. Each of the search results 122a-c includes a title, a display link, and a text snippet. Each of the search results 122a-c is also linked to a respective resource, e.g., a web page at a location indicated by the display link. User selection of a search result will cause the application to navigate to the linked resource. The search results page 100 also includes an indicator 110 that the user is currently logged in.

The search results page 100 also includes a knowledge panel 130 corresponding to an entity with an alias corresponding to the search query 102. In this example, the entity is Abraham Lincoln.

The knowledge panel 130 includes various items of information about Abraham Lincoln. The knowledge panel 130 includes an entity name 132, a picture of the entity 133, items of information 134, including an occupation, a date of birth, a date of death, and a spouse's name.

The search system can provide the knowledge panel 130 as an interface for the user to update one or more items of information maintained by the search system in the knowledge base. For example, the search system can invite the user to correct a specific one of the items of information 134, or the search system can, upon user selection of any of the items of information 134, provide an editable text-input field 136 for editing the item of information. For example, upon user selection of the "Spouse" field, the search system can provide editable text-input field 136 through which the user can edit that particular item of information.

After making changes to the information in the knowledge panel 130, the user can submit the information, e.g., by selecting a "Submit" user interface control 138. The system can then evaluate the submitted information based on one or more criteria, e.g., the user's reliability or data submitted by other users. If the system determines that the update is likely to be accurate, the system can update the knowledge base with the submitted information. In this way, the system can use the knowledge panel 130 as an efficient way to ask for updates to information maintained by the search system from one place and in-line, e.g., without having to navigate away from the search results page 100.

Figure 2:
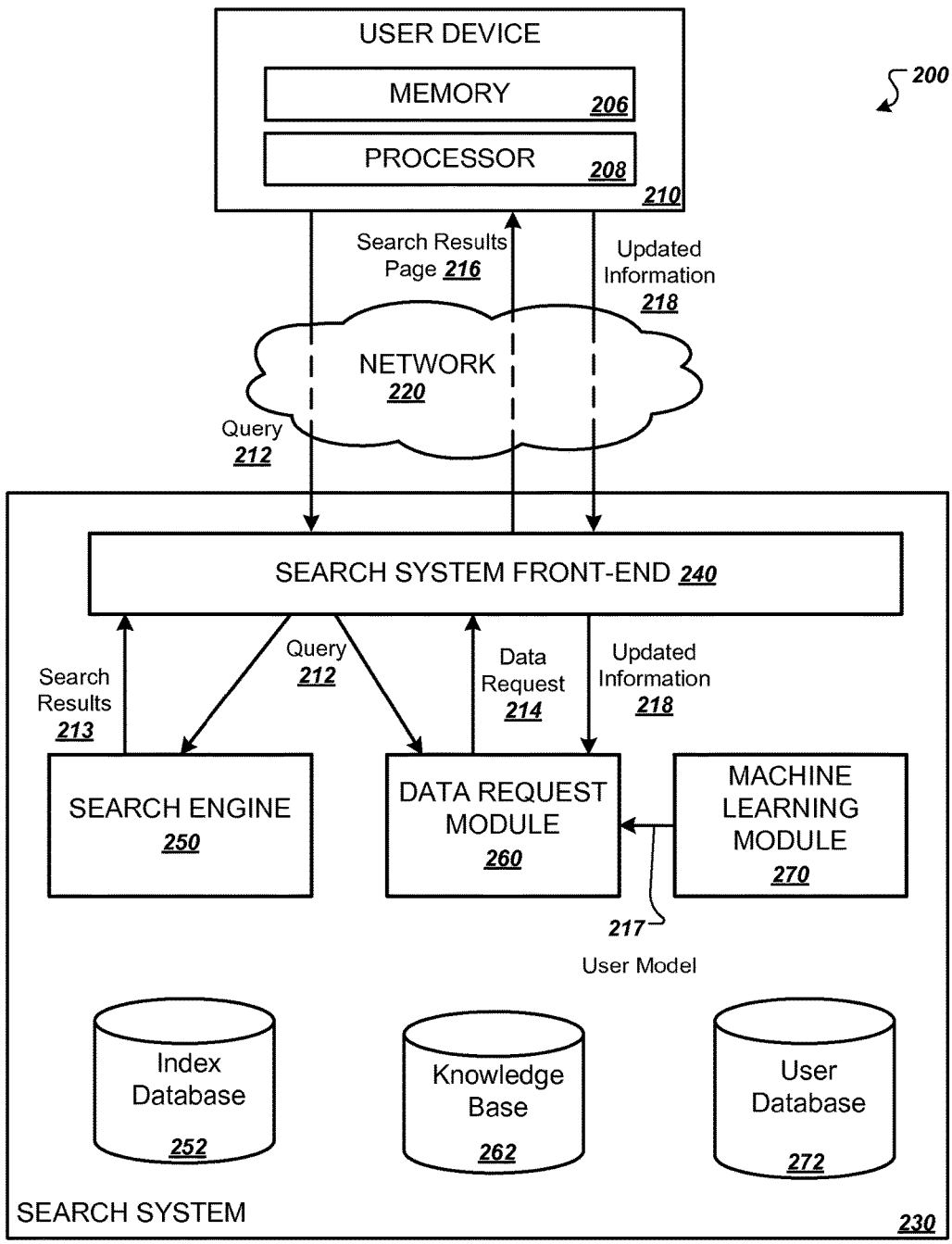
FIG. 2 is a diagram of an example system.

FIG. 2 is a diagram of an example system 200. In general, the system includes a user device 210 coupled to a search system 230 over a network 220. The search system 230 is an example of an information retrieval system in which the systems, components, and techniques described below can be implemented.

In operation, the user device 210 transmits a query 212 to the search system 230, e.g., over the network 220. The query 212 includes one or more terms and can include other information, for example, a location and a type of the user device 210. The search system 230 generates a response, generally in the form of a search results page 216. The search results page 216 can include search results 213 that the search system 230 has identified as being responsive to the query 212.

If the search system 230 determines that the user is likely to know and provide accurate information about a particular entity, e.g., an entity relevant to a user's field of expertise, the search system 230 can provide a data request 214 that requests an update to a particular item of information about the entity in the knowledge base 262. In some implementations, the data request 214 can be included in a knowledge panel for the entity, which can be used as an interface for the user to update the requested items of information. The search system 230 transmits the search results page 216 over the network 220 back to the user device 210 for presentation to a user.

The search system 230 can receive updated information 218 that is either initiated by the user or initiated by a data request 214. The updated information can be received, for example, through a knowledge panel provided on the search results page 216. The search system 230 can then use the updated information 218 to update the knowledge base 262.

The user device 210 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors 208 for executing program instructions and memory 206, e.g., random access memory (RAM). The user device 210 can include non-volatile computer readable media that store software applications, e.g., a browser or layout engine, an input device, e.g., a keyboard or mouse, a communication interface, and a display device.

The network 220 can be, for example, a wireless cellular network, a wireless local area network (WLAN) or Wi-Fi network, a mobile telephone network or other telecommunications network, a wired Ethernet network, a private network such as an intranet, a public network such as the Internet, or any appropriate combination of such networks.

The search system 230 can be implemented as computer programs installed on one or more computers in one or more locations that are coupled to each through a network. The search system 230 includes a search system front end 240, a search engine 250, a data request module 260, and a machine learning module 270. The computing device or devices that implement the search system front end 240, the search engine 250, the data request module 260, and the machine learning module 270 may include similar components.

The search system 230 includes a user database 272 that stores information about users who access the search system 230. For example, the user database 272 may include a user profile for each of the users who access the search system. For users who are registered users of the search system 230, a user profile can include previous submissions by the user to the knowledge base and whether such submissions were accurate or not. A user profile for registered or unregistered users may include user interactions with subsystems of the search system, e.g., a web search system, an image search system, a map system, an email system, a social network system, a blogging system, a shopping system, just to name a few, topics of interest, and an indication of a level of expertise of the user for each of the topics of interest, e.g., novice or expert. The topics of interest and levels of expertise may include user-provided data or system-generated data based on a user's interaction with the search system. For example, the search system may determine that a specific user is interested in French restaurants based on a search history of the specific user or search results selected by the specific user. The search system may then add "restaurants" to the user's topics of interest.

In some implementations, users are distinguished by the IP addresses of the user devices used in performing the activities. In some implementations, activities are recorded by the interactive system involved in the activity. In some implementations, activity information is also, or alternatively, collected with the consent of the user by an application, e.g., a web browser toolbar, running on the user's device.

Where personal information about users may be collected or used, users may be given an opportunity to control whether the personal information about the users is collected. In addition, certain data may be treated in one or more ways before it is stored or used, so that personally identifiable information is removed.

In general, the search system front end 240 receives the query 212 from the user device 210 and routes the query 212 to the search engine 250 and the data request module 260. The search system front end 240 also provides the resulting search results page 216 that includes the search results 213 and the knowledge panel 214 to the user device 210. In doing so, the search system front end 240 acts as a gateway, or interface, between user devices and the search system 230.

The search engine 250 receives the query 212 and generates search results 213 that are responsive to the query. The search engine 250 will generally include an indexing engine for indexing resources in a collection of resources. For example, the search engine 250 can index web pages found in a collection of web pages, e.g., web pages on the Internet. A collection of resources indexed by the indexing engine may, but need not, be stored within search system 230, e.g., in index database 252. The search engine 250 can rank the search results 213 using conventional methods and route the ranked search results 213 back to search system front end 240 for inclusion in the search results page 216.

The data request module 260 receives the query 212 and determines whether the search system 230 should provide a knowledge panel in a response to the query as well as whether to ask the user through a data request 214 to update information about a particular entity. In some implementations, the data request 214 is presented through a knowledge panel on the search results page 216.

The data request module 260 can determine whether the search system 230 should provide a knowledge panel using a data structure of the knowledge base 262 that maps an alias to one or more entities, e.g. an entity alias index. For example, the alias "Bush" can be mapped to a set of entities having that alias, e.g., the entity "George W. Bush," the entity "George H. W. Bush," the entity for the rock band "Bush," and the entity for a category of plants having that alias. The entity alias index may also include a score for each entity that represents a likelihood that the alias refers to each particular entity. The data request module 260 can use some or all of the query 212 as input to the entity alias index. The data request module 260 can use a returned entity for the query to present an entity in a knowledge panel. The data request module 260 can also use a returned entity to identify a topic of the query, which can be used to compute a likelihood that the user will provide accurate updates for the topic.

The data request module 260 evaluates the accuracy of the updated information 218 to determine whether to update the knowledge base 262 with the updated information 218. The data request module 260 can determine both whether to provide a data request 214 as well as the accuracy of the updated information 218 by using a user model 217 generated by the machine learning module 270.

The machine learning module 270 receives the user profile data from user database 272, and generates a user model that predicts the likelihood that a particular user will submit accurate information for the knowledge base. The user model can be trained using one or more items of information in the user profiles, e.g., previous knowledge base submissions on various topics, the accuracy of such submissions, topics of interest of the users, and a level of expertise of the users for each topic of interest.

Figure 3:
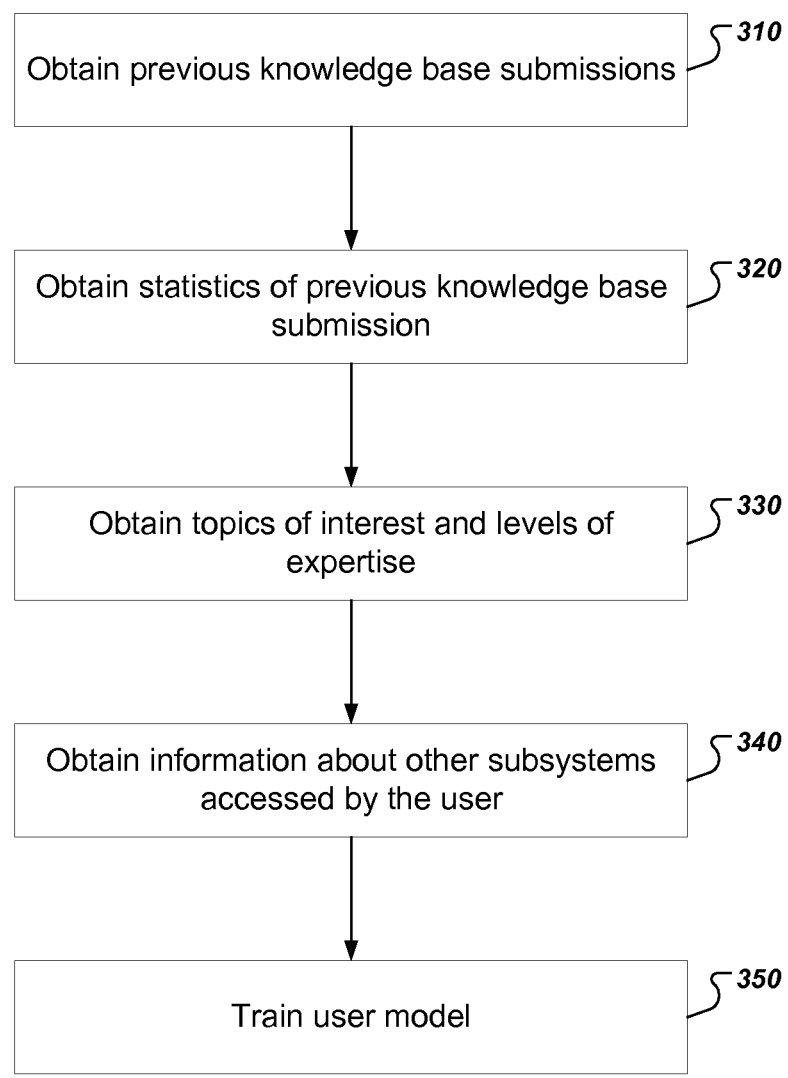
FIG. 3 is a flow chart of an example process for training a user model.

FIG. 3 is a flow chart of an example process for training a user model. The system receives previous knowledge base submissions by users and user profile data of the submitting users. The system then trains a user model that can be used to compute a likelihood that a user having particular user profile data will provide an accurate update for a topic. The process can be implemented by one or more computer programs installed on one or more computers. The process will be described as being performed by a system of one or more computers, e.g. the machine learning module 270 of FIG. 2.

The system obtains previous knowledge base submissions (310). The system can train the user model using training data that includes previous knowledge base submissions on various topics along with information from profiles of the users who provided the submissions. The training data includes training examples that each represents a previous user submission and one or more features of that particular submission. The features can include a topic of the previous user submission and one or more items of information from the user's profile, e.g., a measure of the accuracy of the user's other knowledge base submissions, topics of interest in the user's profile, a level of expertise for each topic of interest, and other subsystems used by the user, for example.

Each training example can be labeled to indicate whether the previous submission by a user was accurate, e.g., with a score ranging from 0 to 1 or with a binary classification as "good"/"bad," or "reliable"/"unreliable." In some implementations, the training data is hand-labeled by administrators of the knowledge base.

The system obtains statistics of a previous knowledge base submission (320). One example feature of the training examples is a measure of the accuracy of previous knowledge base submissions of the user. For example, the system can select the previous knowledge base submissions associated with the user's profile and determine the accuracy of those submissions, e.g., based on the submissions being added to the knowledge base or updates being later changed back, e.g. by knowledge base curators, to a previous version. The accuracy of a particular submission can be determined according to whether the submission was added to the knowledge base, for example, by considering a revision history of the knowledge base after the user's submission. The accuracy of a particular submission can also be determined by verification by other knowledge base users, by an expert, or by an administrator of the search system.

The system can compute statistics to indicate the accuracy of the previous knowledge base submissions that the user has made, for example, a ratio of correct to incorrect submissions. For example, the system can consider a first user with a high ratio of correct to incorrect submissions to be more reliable than a second user with a lower ratio of correct to incorrect submissions.

Other values may be used to represent the accuracy of previous submissions that the user has made to the knowledge base.

The system obtains topics of interest and levels of expertise (330). Another example feature for the training examples includes a level of expertise for each of the topics of interest in the user's profile. In some implementations, the system generates the levels of expertise automatically. For example, the system can determine a level of expertise based on input received from a user and based on the types of documents that the user subsequently accesses. For example, the search system can determine that a user who views highly technical documents may be an expert in a particular field, e.g., medicine or technology. Conversely, the search system can determine that a user who views only general documents associated with the same field is a novice.

The search system can use any appropriate algorithm to determine a level of expertise for a specific user with respect to a specific topic of interest. For example, the search system may use machine learning to create an expertise model to determine a level of expertise for topics associated with profiles of users who access the knowledge base. The expertise model can be trained by using the measure of language sophistication on resources accessed by users as input in order to classify resources as those that would be visited by experts or novices on a particular topic. The system can then use resources visited by a user to determine whether the user is an expert or a novice for the topic.

The system obtains information about other subsystems accessed by the user (340). Another example feature for the training examples includes information about other subsystems of the search system accessed by a user. In general, a higher number of subsystems accessed by the same user is a signal of legitimacy for the associated user. In contrast, a user who has accessed only one subsystem is more likely to be suspect. Thus, a user profile that is associated with the search engine and a social networking website will generally be more likely to have a high predicted accuracy than a user profile that is only associated with the search engine, assuming all other scoring factors are the same.

The system trains the user model (350). The machine learning module 270 uses the labeled training examples to train the user model. The module can be implemented with any appropriate supervised learning algorithm that uses labeled training data, e.g. a support vector machine, logistic regression, or nearest-neighbor classifiers.

In some implementations, the machine learning module performs active learning and updates the user model as the knowledge base receives additional data from users. For example, the machine learning module updates the user model or creates a new user model according to a schedule, e.g., monthly or yearly, or at another predetermined time, e.g., one specified by an administrator.

Figure 4:
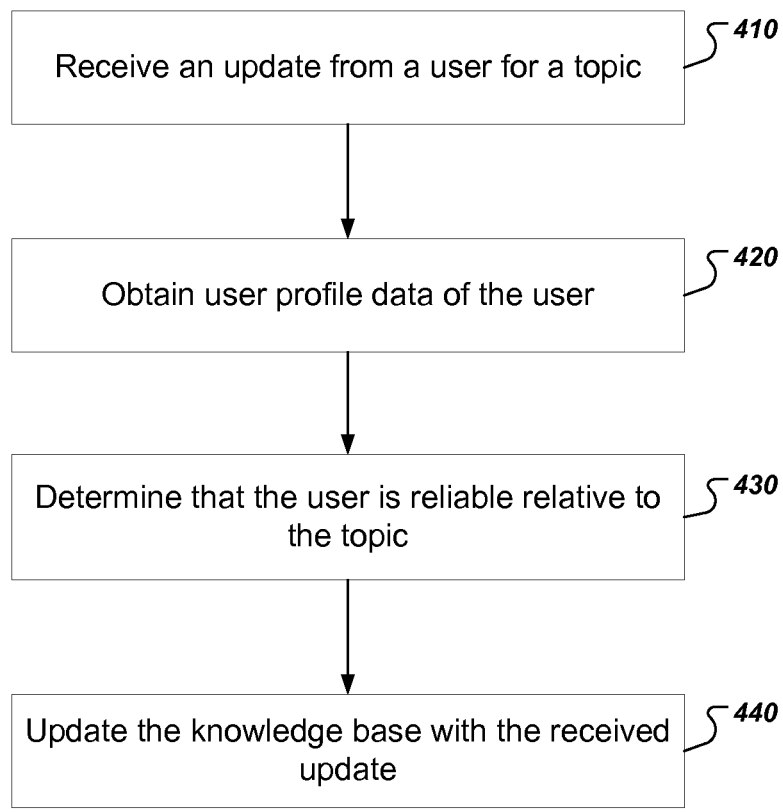
FIG. 4 is a flow chart of an example process for computing the likelihood that a user will provide an accurate update.

FIG. 4 is a flow chart of an example process for computing the likelihood that a user will provide an accurate update. In general, the system receives a data update from a user on a particular topic. The system can then determine a likelihood that the user will provide accurate data on the particular topic using information in the user's profile. The process can be implemented by one or more computer programs installed on one or more computers. The process will be described as being performed by a system of one or more computers, e.g. the data request module 260 of FIG. 2.

The system receives an update from a user for a topic (410). For example, the system can receive an update from a user through a knowledge panel provided as part of a search results page, as illustrated in FIG. 1. The system can determine the topic, for example, by determining one or more entities for which a query submitted by the user is an alias. The system can also receive an update from a user who is browsing and submitting updates to a knowledge base through a direct interface to the knowledge base, in which case the topic can be determined from an entity associated with the update.

The system obtains user profile data of the user (420).

The system determines that the user is reliable relative to the topic (430). A user can be considered reliable relative to a topic if the system determines that the user is likely to provide updates to the knowledge base that are accurate. The system can use the obtained user profile data of the user and the topic of the update as input to a user model to determine the likelihood that an update from the user on the topic is accurate. Generally, if the determined likelihood satisfies a threshold, the system can determine that the user is reliable relative to the topic. The system can then update the knowledge base accordingly without further intervention or inspection by knowledge base administrators.

For example, the system can compute features from the user's profile data and use the features as input to the user model, including the user's previous knowledge base submissions, topics of interest, etc., as described above. The system can then use the features as input to the user model to compute a likelihood that the user's update for the topic is accurate.

Some users may not have any information associated with their profiles. Thus, in some implementations, if the system determines that there is no information available about the user other than the current submission, the system assigns the user a default likelihood of providing an accurate update for the topic.

Alternatively, if the system determines that the likelihood does not satisfy the threshold, the system can seek to verify the submission using input from one or more other users before updating the knowledge base. For example, the system can wait for additional submissions by other users and compute an aggregate likelihood that a particular update to an attribute is reliable. Once a cumulative likelihood of the submissions satisfies a threshold, the system can then determine that the knowledge base should be updated with a value provided by the user submissions.

If the system receives conflicting updates from two or more different users, the system can weight each of the responses to determine a response that has the highest probability of being accurate. For example, when the system receives an update to a phone number of a restaurant from five different users, the system can determine weights for the responses based on the computed likelihood associated with each of the users. Thus, updates from users with a higher likelihood of accuracy can outweigh updates from users with a lower likelihood of accuracy.

In some implementations, if the search system receives a submission from a user who has a low computed likelihood of providing a reliable update, the search system discards the submission and does not update the knowledge base. The search system may also maintain records of such low-likelihood submissions for aggregation with previous and future submissions by other users.

The system can also use different thresholds for updates to existing attributes and new attributes. For example, if the user submits a new attribute, the system can require a higher likelihood that the user will provide accurate updates for the topic than it would if the attribute were an existing attribute for the entity.

Figure 5:
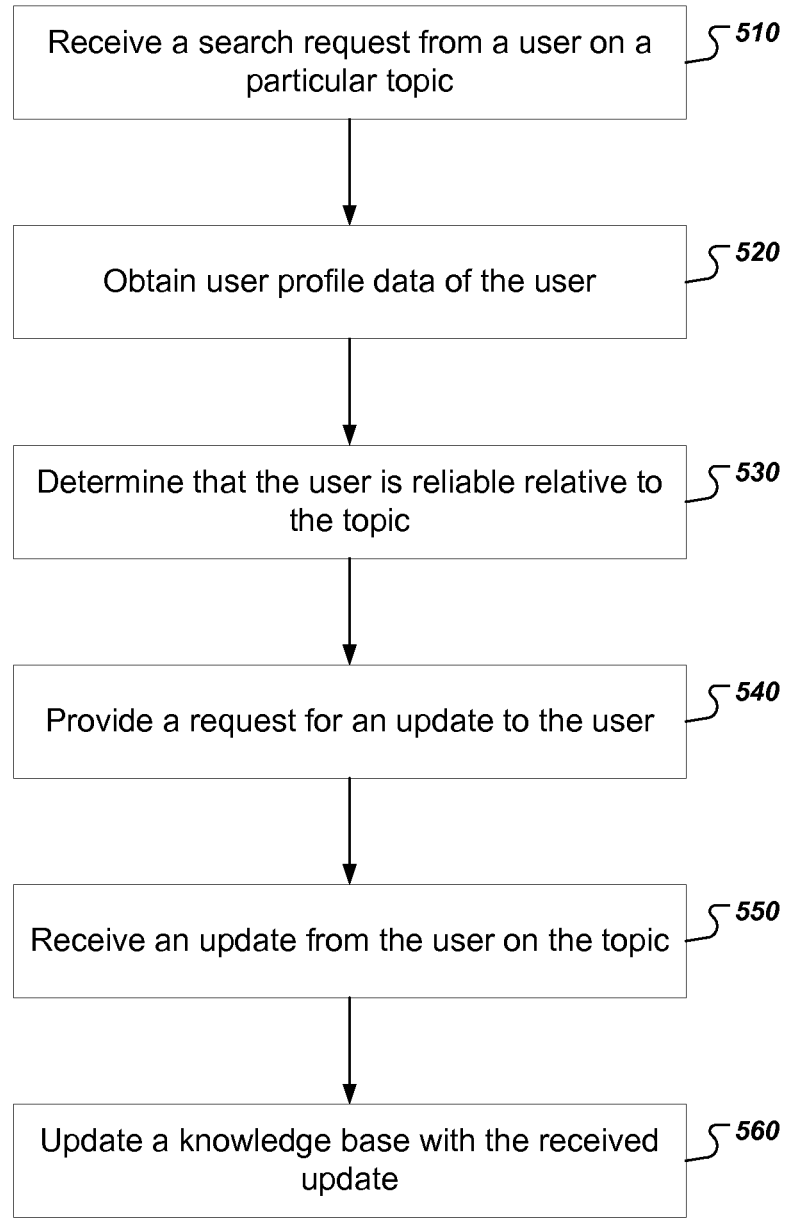
FIG. 5 is a flow chart of an example process for asking particular users to update knowledge base information.

The system updates a knowledge base with the received data update (440). After determining that the knowledge base should be updated, the system can change the value of the attribute as provided by the user. Generally, updating the attribute requires no confirmation by knowledge base administrators and will cause other users that subsequently access knowledge base information, e.g. by information presented in a knowledge panel, to be provided with the updated information. FIG. 5 is a flow chart of an example process for asking particular users to update knowledge base information. In general, the system receives a search request from a user and determines whether to ask the user to provide an update to an attribute of an entity in a knowledge base. The process can be implemented by one or more computer programs installed on one or more computers. The process will be described as being performed by a system of one or more computers, e.g., the search system 230 of FIG. 2.

The system receives a search request from a user on a particular topic (510). For example, the system can receive a search query from a user who is logged into the system. The system can then determine a topic from the search query, for example, by determining an entity for which the search query is an alias. The system can also receive other types of search requests and determine topics from the other types of search requests. For example, the system can receive, from a user, a request for news stories, map data, social networking data, or other requests for other types of data from one or more subsystems of the system.

The system obtains user profile data of the user (520). The system determines that the user is reliable relative to the topic (530). The system can, for example, use information in the user profile data to compute features that can be used as input to the user model, as described in more detail above with reference to FIG. 3. The system can use the user model to compute a likelihood that the user will provide accurate data for the particular topic.

The system can also use the user model to determine which users to provide questions to and when to provide the questions. For example, the system can identify multiple users whose search request is relevant to a particular topic or whose recent search history is relevant to a particular topic. The system can then rank the users according to their respective predicted likelihoods of providing accurate updates to entities related to the particular topic. The system can then choose one or more highest-ranking users to ask for updates.

The system may also consider a time of day of the received request. For example, the system may ask users for updates only during each user's non-working hours, according to the user's local time. Thus, the system can highly rank those users whose request was received during non-working hours for the geographic region from which the request was received.

The system provides a request for an update to the user (540). In some implementations, the system provides a knowledge panel, e.g., as illustrated in FIG. 1, that asks a user if an element of information about a particular entity is correct or incorrect, or invites the user to provide such information in the first instance.

The system receives an update from the user on the topic (550). For example, the system can receive an update submitted by the user through a knowledge panel interface.

The system updates a knowledge base with the received update (560). Because the system previously evaluated the likelihood that the user would provide accurate data for the topic, the system need not again evaluate information in the user's profile to determine a likelihood that the update is accurate. However, the system may still compare the updated data to other sources of data, e.g., updates provided by one or more other users as described above with reference to FIG. 3.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   maintaining a knowledge base accessible by multiple users, wherein the knowledge base comprises information about entities, the information about each entity being represented as one or more attribute-value pairs, each entity being assigned a unique identifier, the entities including entities having text string aliases, wherein the text string aliases include text string aliases that are shared by multiple entities;
   receiving, by a search system from a user having user profile data relating specifically to the user, a search request related to a topic, wherein the user profile data is not stored in the knowledge base;
   determining, from the user profile data not stored in the knowledge base, that updates to the knowledge base provided by the user for the topic are likely to be accurate;
   in response, selecting, by the search system, a knowledge base attribute of an entity maintained in the knowledge base and related to the topic of the search request;
   providing to the user a response to the search request received from the user, wherein the response to the search request includes a knowledge panel that presents one or more items of information about the entity and requests that the user submit, through a user interface control of the knowledge panel, an updated value for the knowledge base attribute selected by the search system for the entity maintained in the knowledge base and related to the topic of the search request received from the user, wherein providing to the user the response to the search request includes providing one or more search results satisfying the search request received from the user;
   receiving, from the user, an updated value for the knowledge base attribute selected by the search system for the entity maintained in the knowledge base and related to the topic of the search request received from the user; and
   updating the knowledge base with the updated value received from the user for the knowledge base attribute selected by the search system for the entity maintained in the knowledge base and related to the topic of the search request received from the user.

2. The method of claim 1, wherein determining, from the user profile data, that updates to the knowledge base provided by the user for the topic are likely to be accurate comprises:
   computing, using the user profile data as input to a user model, a likelihood that an update from the user to an entity related to the topic is accurate; and
   determining that the computed likelihood satisfies a threshold.

3. The method of claim 2, wherein the user model is trained using training examples that represent previously submitted updates to the knowledge base by users, the training examples including data representing whether the previously submitted updates were accurate.

4. The method of claim 3, wherein each training example includes information from a user profile of a user that submitted an update represented by the training example.

5. The method of claim 4, wherein the information from the user profile includes one or more statistics describing a measure of accuracy of knowledge base submissions by the user.

6. The method of claim 5, wherein the information from the user profile includes information about subsystems of the search system accessed by the user, wherein the search system considers users who access more subsystems of the search system to be more reliable than users who access fewer subsystems of the search system.

7. The method of claim 2, further comprising whenever the likelihood satisfies a threshold for a particular user, updating the knowledge base with a value of the attribute provided by the particular user without further inspection by knowledge base administrators.

8. The method of claim 1, wherein updating the knowledge base with the updated value for the selected attribute of the entity comprises updating an attribute-value pair in the knowledge base without receiving confirmation by knowledge base administrators for the update.

9. The method of claim 8, further comprising:
receiving, from a different second user, a subsequent search request related to the topic; and
providing, to the second user, information about the entity including the updated value for the attribute of the entity.

10. The method of claim 1, wherein the entity is a person, a place, an animal, an event, an organization, a sports team, a movie, a song, or a work of art.

11. A system comprising:
one or more computers and one or more storage devices storing instructions that are operable, when executed by the one or more computers, to cause the one or more computers to perform operations comprising:
maintaining a knowledge base accessible by multiple users, wherein the knowledge base comprises information about entities, the information about each entity being represented as one or more attribute-value pairs, each entity being assigned a unique identifier, the entities including entities having text string aliases, wherein the text string aliases include text string aliases that are shared by multiple entities;
receiving, by a search system from a user having user profile data relating specifically to the user, a search request related to a topic, wherein the user profile data is not stored in the knowledge base;
determining, from the user profile data not stored in the knowledge base, that updates to the knowledge base provided by the user for the topic are likely to be accurate;
in response, selecting, by the search system, a knowledge base attribute of an entity maintained in the knowledge base and related to the topic of the search request;
providing to the user a response to the search request received from the user, wherein the response to the search request includes a knowledge panel that presents one or more items of information about the entity and requests that the user submit, through a user interface control of the knowledge panel, an updated value for the knowledge base attribute selected by the search system for the entity maintained in the knowledge base and related to the topic of the search request received from the user, wherein providing to the user the response to the search request includes providing one or more search results satisfying the search request received from the user;
receiving, from the user, an updated value for the knowledge base attribute selected by the search system for the entity maintained in the knowledge base and related to the topic of the search request received from the user; and
updating the knowledge base with the updated value received from the user for the knowledge base attribute selected by the search system for the entity maintained in the knowledge base and related to the topic of the search request received from the user.

12. The system of claim 11, wherein determining, from the user profile data, that updates to the knowledge base provided by the user for the topic are likely to be accurate comprises:
computing, using the user profile data as input to a user model, a likelihood that an update from the user to an entity related to the topic is accurate; and
determining that the computed likelihood satisfies a threshold.

13. The system of claim 12, wherein the user model is trained using training examples that represent previously submitted updates to the knowledge base by users, the training examples including data representing whether the previously submitted updates were accurate.

14. The system of claim 13, wherein each training example includes information from a user profile of a user that submitted an update represented by the training example.

15. The system of claim 14, wherein the information from the user profile includes one or more statistics describing a measure of accuracy of knowledge base submissions by the user.

16. The system of claim 15, wherein the information from the user profile includes information about subsystems of the search system accessed by the user, wherein the search system considers users who access more subsystems of the search system to be more reliable than users who access fewer subsystems of the search system.

17. The system of claim 11, wherein updating the knowledge base with the updated value for the selected attribute of the entity comprises updating an attribute-value pair in the knowledge base without receiving confirmation by knowledge base administrators for the update.

18. The system of claim 17, wherein the operations further comprise:
receiving, from a different second user, a subsequent search request related to the topic; and
providing, to the second user, information about the entity including the updated value for the attribute of the entity.

19. The system of claim 11, wherein the entity is a person, a place, an animal, an event, an organization, a sports team, a movie, a song, or a work of art.

20. A computer program product, encoded on one or more non-transitory computer storage media, comprising instructions that when executed by one or more computers cause the one or more computers to perform operations comprising:
maintaining a knowledge base accessible by multiple users, wherein the knowledge base comprises information about entities, the information about each entity being represented as one or more attribute-value pairs, each entity being assigned a unique identifier, the entities including entities having text string aliases, wherein the text string aliases include text string aliases that are shared by multiple entities;
receiving, by a search system from a user having user profile data relating specifically to the user, a search request related to a topic, wherein the user profile data is not stored in the knowledge base;
determining, from the user profile data not stored in the knowledge base, that updates to the knowledge base provided by the user for the topic are likely to be accurate;
in response, selecting, by the search system, a knowledge base attribute of an entity maintained in the knowledge base and related to the topic of the search request;
providing to the user a response to the search request received from the user, wherein the response to the search request includes a knowledge panel that presents one or more items of information about the entity and requests that the user submit, through a user interface control of the knowledge panel, an updated value for the knowledge base attribute selected by the search system for the entity maintained in the knowledge base and related to the topic of the search request received from the user, wherein providing to the user the response to the search request includes providing one or more search results satisfying the search request received from the user;

receiving, from the user, an updated value for the knowledge base attribute selected by the search system for the entity maintained in the knowledge base and related to the topic of the search request received from the user; and updating the knowledge base with the updated value received from the user for the knowledge base attribute selected by the search system for the entity maintained in the knowledge base and related to the topic of the search request received from the user.

21. The computer program product of claim 20, wherein determining, from the user profile data, that updates to the knowledge base provided by the user for the topic are likely to be accurate comprises:

computing, using the user profile data as input to a user model, a likelihood that an update from the user to an entity related to the topic is accurate; and determining that the computed likelihood satisfies a threshold.

22. The computer program product of claim 21, wherein the operations further comprise:

whenever the likelihood satisfies a threshold for a particular user, updating the knowledge base with a value of the attribute provided by the particular user without further inspection by knowledge base administrators.

23. The computer program product of claim 20, wherein the entity is a person, a place, an animal, an event, an organization, a sports team, a movie, a song, or a work of art.

* * * * *